United States Patent
Bensalem et al.

(10) Patent No.: US 11,287,895 B2
(45) Date of Patent: Mar. 29, 2022

(54) SYSTEM FOR REMOTE VEHICLE DOOR AND WINDOW OPENING

(71) Applicant: TOYOTA MOTOR ENGINEERING & MANUFACTURING NORTH AMERICA, INC., Plano, TX (US)

(72) Inventors: Salem Bensalem, Lansing, MI (US); Mingher F. Shen, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 9 days.

(21) Appl. No.: 16/797,989

(22) Filed: Feb. 21, 2020

(65) Prior Publication Data
US 2021/0263591 A1   Aug. 26, 2021

(51) Int. Cl.
| G06F 3/01 | (2006.01) |
| E05F 15/60 | (2015.01) |
| B60R 25/20 | (2013.01) |
| G06F 3/023 | (2006.01) |
| B60R 25/102 | (2013.01) |

(52) U.S. Cl.
CPC .............. *G06F 3/017* (2013.01); *E05F 15/60* (2015.01); *G06F 3/0231* (2013.01); *B60R 25/102* (2013.01); *B60R 25/2045* (2013.01); *E05F 2700/02* (2013.01)

(58) Field of Classification Search
CPC ........... E05Y 2900/531; E05Y 2900/55; E05F 15/611; E05F 15/632; E05F 15/665; E05F 15/73; G06F 3/017; B60R 25/2045
See application file for complete search history.

(56) References Cited

U.S. PATENT DOCUMENTS

| 9,593,522 | B1 * | 3/2017 | Murar ...................... E05F 15/77 |
| 9,646,436 | B1 | 5/2017 | Campbell et al. |
| 10,176,368 | B1 * | 1/2019 | Ramakrishnan ........ E05F 15/73 |
| 2006/0164385 | A1 * | 7/2006 | Smith .................... G06F 3/0354 |
| | | | 345/156 |

(Continued)

FOREIGN PATENT DOCUMENTS

| CN | 107719303 A | 2/2018 |
| WO | 2019029782 A1 | 2/2019 |

*Primary Examiner* — Ryan F Pitaro
(74) *Attorney, Agent, or Firm* — Haynes and Boone, LLP

(57) ABSTRACT

Disclosed is a vehicle door and window opening system comprising a controller that includes a user control, a motion sensor configured to detect a first defined motion and a second defined motion of the controller, and a transmitter configured to transmit signals related to the motion sensor and the user control. The system also includes at least one actuator, a receiver configured to receive the signals, and a control unit in communication with the receiver and the at least one actuator. When the user control is activated and released, the control unit commands a first action from the at least one actuator. When the user control is activated and held while the motion sensor detects the first defined motion, the control unit commands a second action from the at least one actuator. When the user control is activated and held while the motion sensor detects the second defined motion, the control unit commands a third action from the at least one actuator.

18 Claims, 10 Drawing Sheets

(56) References Cited

U.S. PATENT DOCUMENTS

| | | | |
|---|---|---|---|
| 2009/0241052 A1* | 9/2009 | Ha | H04N 5/4403 |
| | | | 715/772 |
| 2010/0052931 A1* | 3/2010 | Kolpasky | B60R 25/00 |
| | | | 340/670 |
| 2012/0249291 A1* | 10/2012 | Holcomb | G07C 9/00563 |
| | | | 340/5.51 |
| 2013/0275008 A1* | 10/2013 | Breed | E05F 15/77 |
| | | | 701/49 |
| 2014/0005857 A1* | 1/2014 | Heisterkamp | B60W 50/08 |
| | | | 701/1 |
| 2014/0379175 A1* | 12/2014 | Mittermeier | B60R 25/2045 |
| | | | 701/2 |
| 2015/0279131 A1* | 10/2015 | Nespolo | G06F 3/014 |
| | | | 340/5.72 |
| 2015/0281658 A1* | 10/2015 | Lee | H04N 7/183 |
| | | | 348/211.1 |
| 2016/0176372 A1* | 6/2016 | Kim | G06F 3/06 |
| | | | 701/49 |
| 2016/0187995 A1* | 6/2016 | Rosewall | G08C 17/02 |
| | | | 345/156 |
| 2016/0297324 A1* | 10/2016 | Taylor | B60N 2/002 |
| 2016/0357262 A1* | 12/2016 | Ansari | G06Q 10/0833 |
| 2017/0282856 A1* | 10/2017 | Riedel | B60R 25/24 |
| 2018/0236972 A1* | 8/2018 | Linden | B60R 25/01 |
| 2019/0121535 A1* | 4/2019 | Tamane | G07C 9/00896 |
| 2020/0157873 A1* | 5/2020 | Sabatini | B60Q 1/323 |
| 2020/0219338 A1* | 7/2020 | Chen | G07C 9/29 |

\* cited by examiner

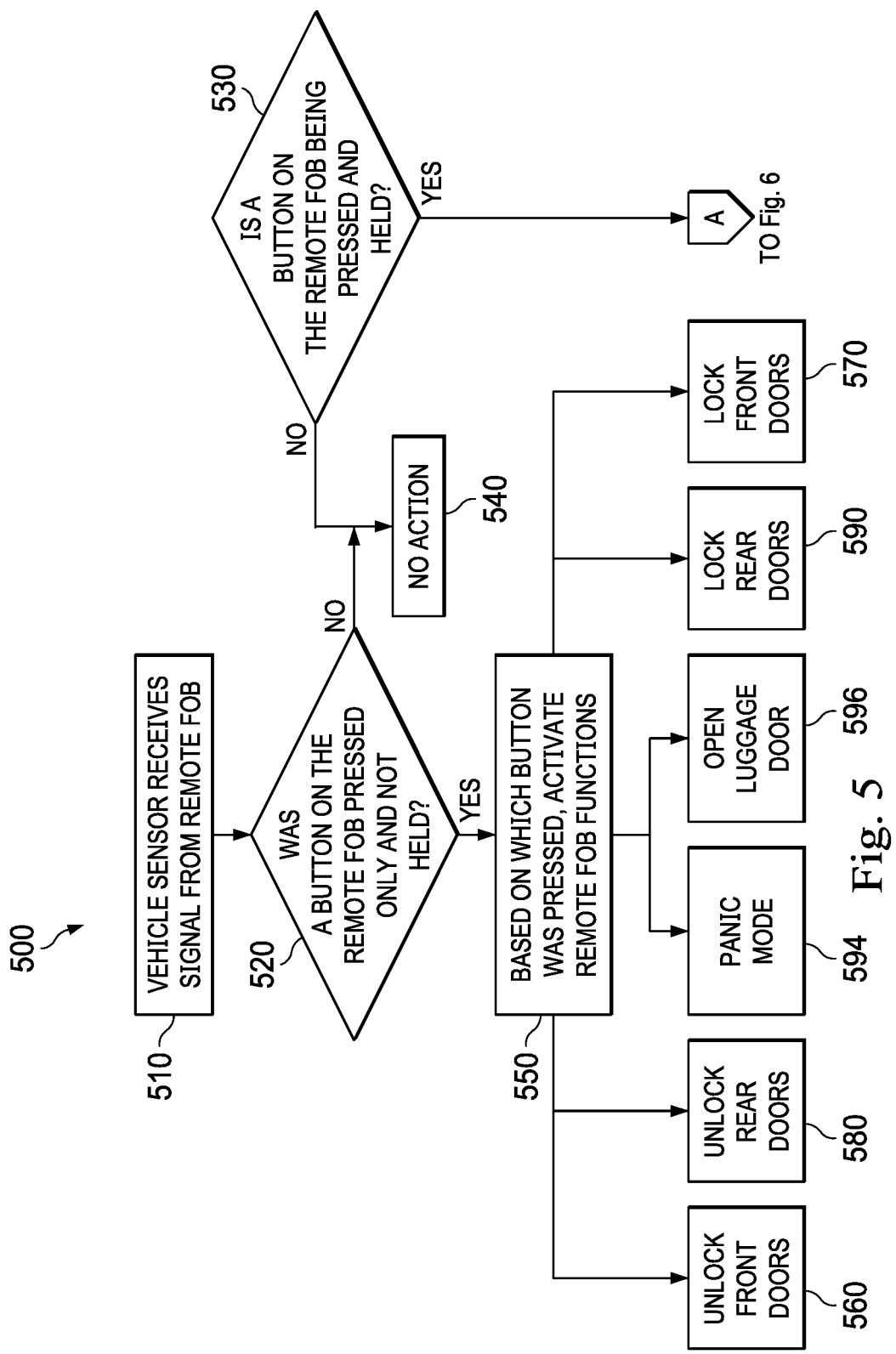

SYSTEM FOR REMOTE VEHICLE DOOR AND WINDOW OPENING

TECHNICAL FIELD

The subject matter described herein relates to devices and methods for opening and closing the doors and windows of a vehicle using an electronic fob. This technology has particular but not exclusive utility for cars and trucks.

BACKGROUND

Vehicle doors are normally opened with a door handle, located either on the inside or outside of the door. Entry into a vehicle may be accomplished by unlocking a door using a key, and then opening the door with the door handle. Windows are normally opened or closed using hand cranks or electronic switches located on the inside of the vehicle (e.g., on inside door panels). However, there may be instances when it is desirable to open a vehicle door or window remotely. For example, in hot weather it may be desirable to open a door or window of the vehicle to allow hot air to begin escaping before the user enters the vehicle. When a user is carrying objects, it may be desirable to open a door without having to operate the door handle manually. Similarly, it may save time or effort for a user to close a door or window remotely while walking away from the vehicle.

The information included in this Background section of the specification, including any references cited herein and any description or discussion thereof, is included for technical reference purposes only and is not to be regarded as limiting.

SUMMARY

Disclosed is a door and window opening system that permits a user to control the independent opening and closing of four separate doors and independent control of pairs of windows (e.g., front windows and rear windows), using a plurality of buttons and a gesture detection system (e.g., built into an electronic key fob). The choice of button may indicate a choice of front or back, and/or a choice of open or close. The intention to operate the left side door, right side door, or both side doors may be determined by a clockwise or counterclockwise motion of the fob, and the intention to open or close windows may be indicated by an upward or downward motion of the fob. Additional buttons may be provided, such as a panic button and a luggage door open/close toggle button.

The door and window opening system disclosed herein has particular, but not exclusive, utility for remotely operating the doors and windows of cars and trucks. One general aspect of the door and window opening system includes a controller including: a first user control, a motion sensor configured to detect a first defined motion of the controller and a second defined motion of the controller, and a transmitter configured to transmit signals related to the motion sensor and the first user control. The system also includes at least one actuator; a receiver configured to receive the signals from the transmitter related to the motion sensor and the first user control, and a control unit in communication with the receiver and the at least one actuator. When the signals received by the receiver indicate that the first user control is activated and released, the control unit commands a first action from the at least one actuator. When the signals received by the receiver indicate that the first user control is activated and held while the motion sensor detects the first defined motion of the controller, the control unit commands a second action from the at least one actuator. When the signals received by the receiver indicate that the first user control is activated and held while the motion sensor detects the second defined motion of the controller, the control unit commands a third action from the at least one actuator. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Other embodiments of this aspect include corresponding computer systems, apparatus, and computer programs recorded on one or more computer storage devices, each configured to perform the actions of the methods.

Implementations may include one or more of the following features. The system where the controller is a wireless handheld controller. The system where the at least one actuator controls opening, closing, locking, or unlocking of at least one component of a vehicle. The system where the at least one component of the vehicle includes a door or window. The system further comprising a proximity sensor configured to detect an object within a specified volume surrounding the door, and where the control unit is configured to restrict the opening of the door if the object is detected within the specified volume of the door. The system where the control unit is configured to trigger an audible alert if the closing of the door is incomplete. The system further including the vehicle. The system where each specific user control causes the controller to command: a first control-specific action from the plurality of actuators when the specific user control is activated and released; a second control-specific action from the plurality of actuators when the specific user control is activated and held while the motion sensor detects the first defined motion of the controller; and a third control-specific action from the plurality of actuators when the specific user control is activated and held while the motion sensor detects the second defined motion of the controller. The system where the motion sensor is configured to detect a plurality of defined motions of the controller, where the at least one actuators includes a plurality of actuators, where each specific defined motion causes the controller to command a motion-specific action from the plurality of actuators when the first user control is activated and held while the motion sensor detects the specific defined motion. The system where the motion sensor is configured to detect a plurality of defined motions of the controller, and where each specific user control causes the controller to command: a control-specific action from the plurality of actuators when the specific user control is activated and released; and a control-specific and motion-specific action from the plurality of actuators when the user control is activated and held and the motion sensor detects a specific defined motion of the plurality of defined motions. The system where the specific defined motion of the plurality of defined motions is detected by the motion sensor and identified by the control unit. The system where the plurality of defined motions includes a clockwise motion, a counterclockwise motion, an upward motion, and a downward motion. Implementations of the described techniques may include hardware, a method or process, or computer software on a computer-accessible medium.

One general aspect includes a method comprising identifying in real time, within a control unit in communication with a controller, an activation status of a first user control of a wireless handheld controller and a sensor output of a motion sensor configured to detect motion of the wireless handheld controller; when the first user control is activated and released, commanding, via the control unit, a first action from a plurality of actuators, and when the first user control is activated and held while the control unit identifies a first defined motion of the wireless handheld controller from the sensor output of the motion sensor, commanding, via the control unit, a second action from the plurality of actuators; and when the first user control is activated and held while the control unit identifies a second defined motion of the wireless handheld controller from the sensor output of the motion sensor, commanding, via the control unit, a third action from the plurality of actuators. Other embodiments of this aspect include corresponding computer systems, apparatus, and computer programs recorded on one or more computer storage devices, each configured to perform the actions of the methods.

Implementations may include one or more of the following features. The method where the plurality of actuators controls the opening, closing, locking, or unlocking of at least one vehicle component. The method where the at least one vehicle component includes a door or window. The method further including: identifying in real time, within the control unit, an activation status of a plurality of user controls; and commanding, via the control unit, a first control-specific action from the plurality of actuators when a specific user control is activated and released; commanding, via the control unit, a second control-specific action from the plurality of actuators when the specific user control is activated and held while the control unit identifies the first defined motion of the wireless handheld controller; and commanding, via the control unit, a third control-specific action from the plurality of actuators when the specific user control is activated and held while the control unit identifies the second defined motion of the wireless handheld controller. The method further including: commanding, via the control unit, a motion-specific action from the plurality of actuators then the first user control is activated and held while the control unit identifies a specific defined motion of the wireless handheld controller from a plurality of defined motions of the wireless handheld controller. The method further including: commanding, via the control unit, a control-specific and motion-specific action from the plurality of actuators when a specific user control from a plurality of user controls is activated and held while the control unit identifies a specific defined motion of the wireless handheld controller from a plurality of defined motions of the wireless handheld controller. Implementations of the described techniques may include hardware, a method or process, or computer software on a computer-accessible medium.

One general aspect includes a system for controlling doors and windows of a vehicle a wireless handheld controller including: first button, a second button, a third button, and a fourth button; a motion sensor configured to detect: a clockwise motion of the wireless handheld controller; a counterclockwise motion of the wireless handheld controller; an upward motion of the wireless handheld controller; and a downward motion of the wireless handheld controller. The system also includes a power source; and a transmitter configured to transmit signals related to the motion sensor and the buttons. The system also includes a vehicle including: a plurality of actuators, a receiver configured to receive the signals related to the motion sensor and the buttons, and a control unit in communication with the receiver and the plurality of actuators, such that: when the first button is pressed and released, the control unit commands a first action from the plurality of actuators, and when the first button is pressed and held while the motion sensor detects the clockwise motion of the wireless handheld controller, the control unit commands a second action from the plurality of actuators, and when the first button is pressed and held while the motion sensor detects the counterclockwise motion of the wireless handheld controller, the control unit commands a third action from the plurality of actuators, and when the first button is pressed and held while the motion sensor detects the upward motion of the wireless handheld controller, the control unit commands a fourth action from the plurality of actuators, and when the second button is pressed and released, the control unit commands a fifth action from the plurality of actuators, and when the second button is pressed and held while the motion sensor detects the clockwise motion of the wireless handheld controller, the control unit commands a sixth action from the plurality of actuators, and when the second button is pressed and held while the motion sensor detects the counterclockwise motion of the wireless handheld controller, the control unit commands a seventh action from the plurality of actuators, and when the second button is pressed and held while the motion sensor detects the upward motion of the wireless handheld controller, the control unit commands an eighth action from the plurality of actuators, and when the third button is pressed and released, the control unit commands a ninth action from the plurality of actuators, and when the third button is pressed and held while the motion sensor detects the clockwise motion of the wireless handheld controller, the control unit commands a tenth action from the plurality of actuators, and when the third button is pressed and held while the motion sensor detects the counterclockwise motion of the wireless handheld controller, the control unit commands an eleventh action from the plurality of actuators, and when the third button is pressed and held while the motion sensor detects the upward motion of the wireless handheld controller, the control unit commands a twelfth action from the plurality of actuators, and when the fourth button is pressed and released, the control unit commands a thirteenth action from the plurality of actuators, and when the fourth button is pressed and held while the motion sensor detects the clockwise motion of the wireless handheld controller, the control unit commands a fourteenth action from the plurality of actuators, and when the fourth button is pressed and held while the motion sensor detects the counterclockwise motion of the wireless handheld controller, the control unit commands a fifteenth action from the plurality of actuators, and when the fourth button is pressed and held while the motion sensor detects the upward motion of the wireless handheld controller, the control unit commands a sixteenth action from the plurality of actuators. Other embodiments of this aspect include corresponding computer systems, apparatus, and computer programs recorded on one or more computer storage devices, each configured to perform the actions of the methods.

Implementations may include one or more of the following features. The system further including a panic button and a luggage door button, where the controller is configured to enter a panic mode when the panic button is depressed, and where the controller is configured to activate a luggage door actuator when the luggage door button is depressed, and where the first button is a front open button, the second button is a front close button, the third button is a rear open button, and the fourth button is a rear close button. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the door and window opening system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 5 shows a flow diagram of an example remote door and window opening and closing method according to at least one embodiment of the present disclosure.

DETAILED DESCRIPTION

Figure 1:
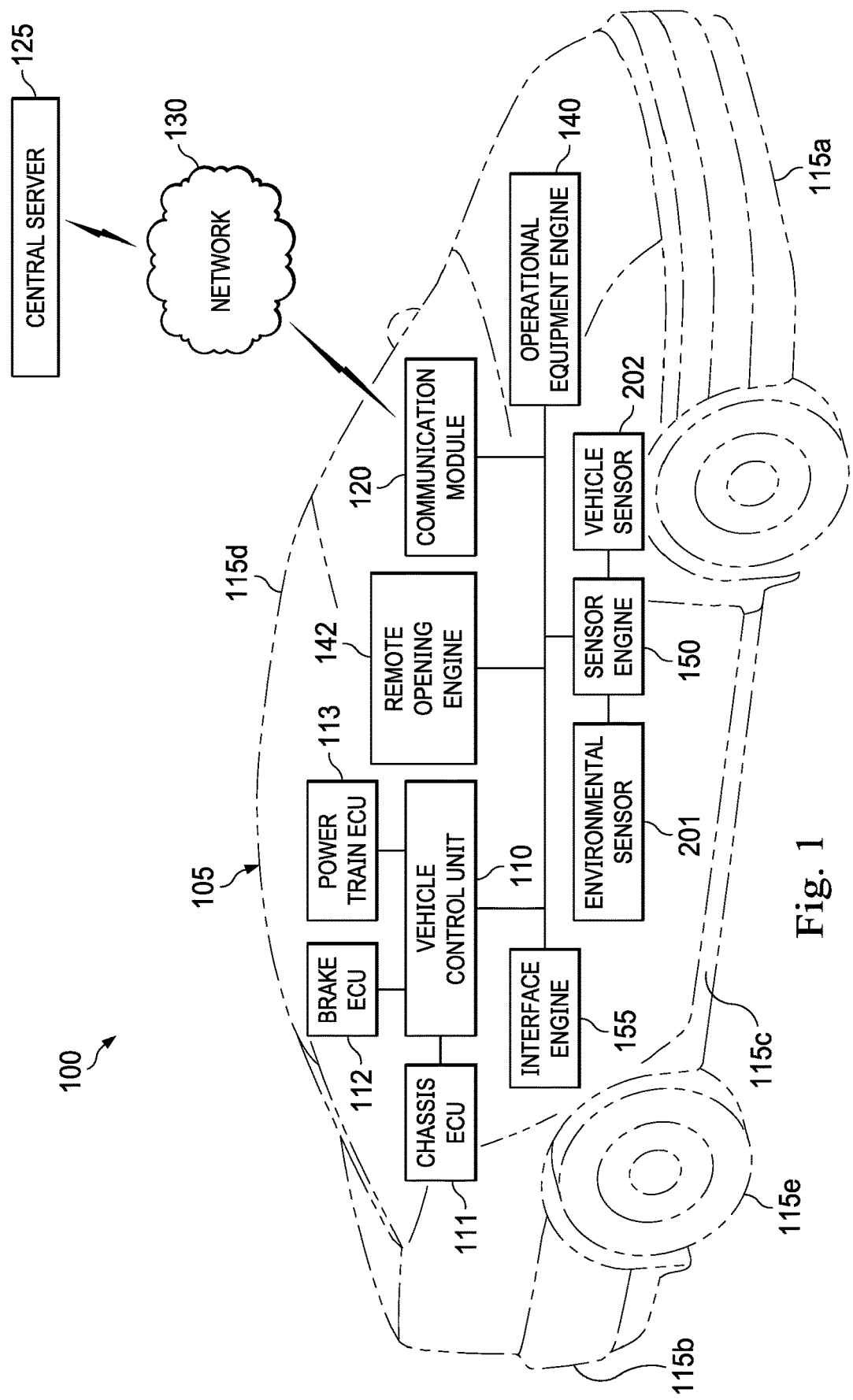
FIG. 1 is a diagrammatic illustration of a vehicle door and window opening system in accordance with at least one embodiment of the present disclosure.

In accordance with at least one embodiment of the present disclosure, a vehicle door and window opening system is provided that permits a user to control the independent opening and closing of, for example, four separate doors and independent opening and closing of, for example, two linked pairs of windows (e.g., a pair of front windows and a pair of rear windows), using for example four buttons and a gesture detection system built into an electronic key fob. The choice of button may indicate a choice of the front or back of the vehicle, and/or a choice of an opening or closing action. The intention to operate the left side door, right side door, or both side doors may be determined by the presence or absence of a clockwise or counterclockwise motion of the fob, and the intention to open or close windows may be indicated by an upward or downward motion of the fob. Additional buttons may be provided, such as a panic button and a luggage door open/close toggle button. Depending on the implementation, the left/right sides, clockwise/counterclockwise motions, or up/down motions may be swapped in some embodiments, and pairs or other groupings of doors or windows may be grouped differently than described herein.

In some embodiments, the vehicle door and window opening system includes a key fob with a Front Open button, a Front Close button, a Rear Open button, and a Rear Close button. In some embodiments, the system may also include one or more sensors and one or more processors capable of detecting motions of the fob, such as clockwise and counterclockwise swinging, upward swinging, or downward swinging of the fob. These sensors and processors may for example be located within the fob, within the vehicle, or external to both the fob and the vehicle.

The present disclosure aids substantially in the opening and closing of vehicle doors and windows, by improving the ability of the vehicle operator to open and close the doors and windows without being inside or immediately proximate to the vehicle. In some embodiments, door lock/unlock features may be included as well. Implemented on an electronic key fob in communication with a processor, the door and window opening system disclosed herein provides practical, context sensitive door and window controls. This improved door and window functionality transforms a hands-on operation of opening or closing a door or window into an operation that can be performed remotely, without the normally routine need to approach and directly operate the vehicle door and window controls on the vehicle itself. This unconventional approach improves the functioning of the vehicle, by permitting doors and windows to be opened in a more timely manner while approaching or walking away from the vehicle, by permitting hot air to escape before occupants enter the vehicle, and by permitting encumbered users to open doors and windows using relatively small movements (e.g., movement of the fingers of one hand).

The door and window opening system may be implemented as an electronic key fob, and operated by a control process executing on a processor that accepts user inputs from the fob. In that regard, the control process performs certain specific operations in response to different inputs or selections made at different times, by the user operating the key fob. Certain structures, functions, and operations of the processor, sensors, and user input systems are known in the art, while others are recited herein to enable novel features or aspects of the present disclosure with particularity.

These descriptions are provided for exemplary purposes only, and should not be considered to limit the scope of the door and window opening system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration of a vehicle door and window opening system in accordance with at least one embodiment of the present disclosure. In an example, a vehicle door and window opening system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle door and window opening system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a remote opening engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
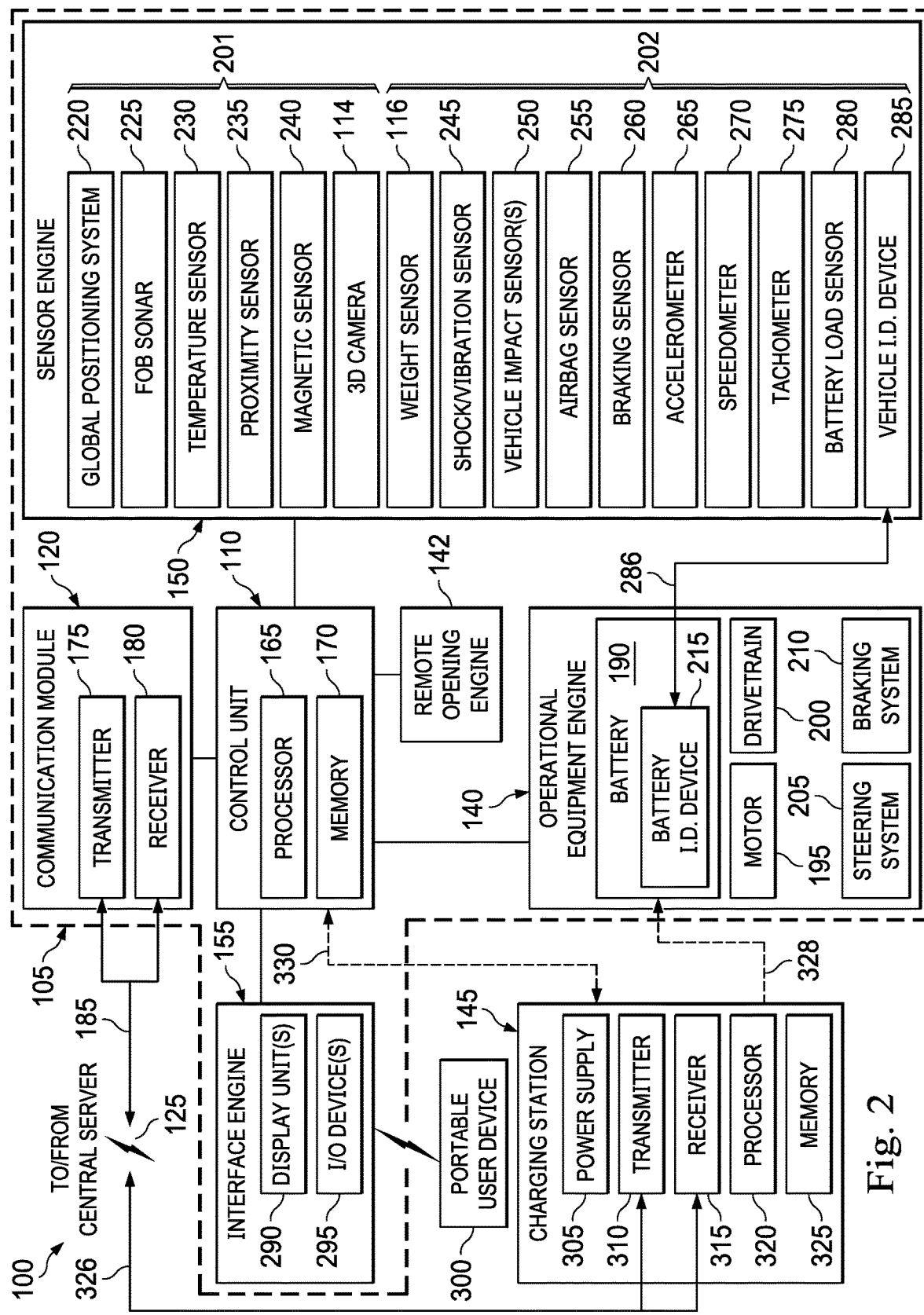
FIG. 2 is a diagrammatic illustration, in a block-diagram form, of at least a portion of the door and window opening system of FIG. 1, in accordance with at least one embodiment of the present disclosure.

FIG. 2 is a diagrammatic illustration, in a block-diagram form, of at least a portion of the door and window opening system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a 2D or 3D sonar sensor 225, a 2D or 3D proximity sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated. In other examples, the portable device is, or serves as, an electronic key fob.

The vehicle door and window opening system 100 also includes a remote opening engine 142, the operation of which will be described below. In some embodiments, the remote opening engine 142 comprises a standalone housing with its own processor and memory. In other embodiments, the remote opening engine 142 exists as software, firmware, or hardware within another processor, such as the vehicle control unit 110, operational equipment engine 140, or power train ECU 113. The sensor engine 150 includes environmental sensors 201 and vehicle sensors 202. In an example, the remote opening engine 142 receives key press data and gesture-sensor or motion-sensor data from an electronic key fob 300. This sensor may for example be an accelerometer (e.g., a one-axis, two-axis, or three-axis accelerometer), a magnetometer (e.g., a magnetoresistive compass), a tilt sensor, motion detector, or camera. In other examples, gesture-sensing or motion sensing is performed using data from sensors on board the vehicle, such as for example a sonar 225, proximity sensor 235, magnetic sensor 240, or camera 114 (whether 2D or 3D) that is capable of detecting movements of the electronic fob 300.

A reader of ordinary skill in the art will understand that other components or arrangements of components may be found in a vehicle 105, and that the same general principles apply to electric vehicles, internal combustion vehicles, and hybrid vehicles.

Figure 3:
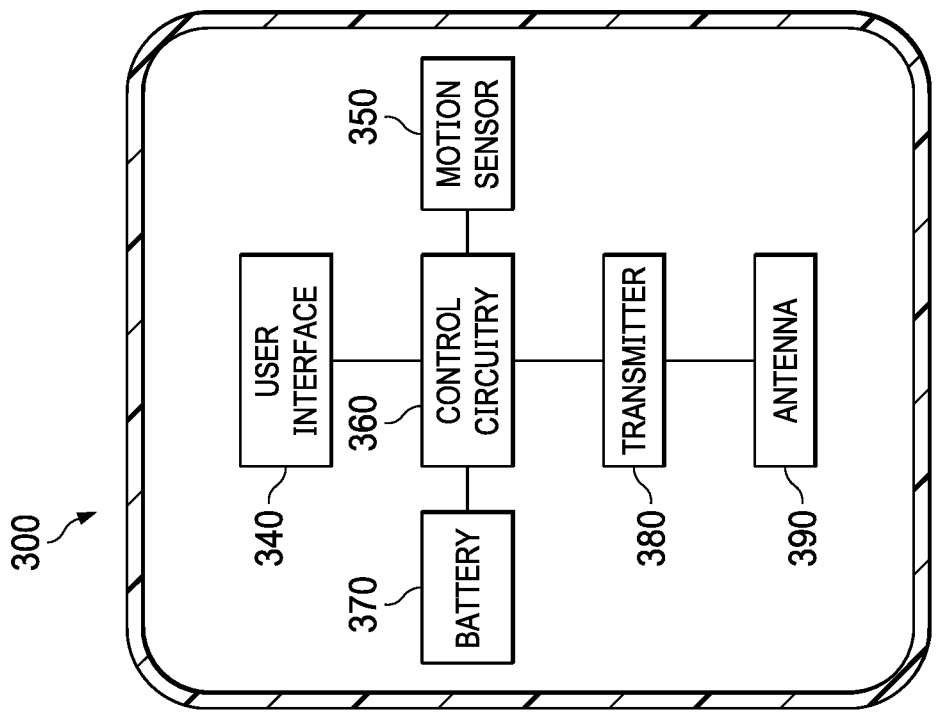
FIG. 3 is a diagrammatic illustration, in a block-diagram form, of an example key fob of a door and window opening system in accordance with at least one embodiment of the present disclosure.

FIG. 3 is a diagrammatic illustration of an example key fob 300 of a door and window opening system 100 in accordance with at least one embodiment of the present disclosure. In an example, the key fob 300 includes a user interface 340 that may for example include four or more buttons that the user can press with a thumb or finger. In an example, the fob 300 also includes a motion sensor 350 capable of detecting swinging motions of the fob 300, as well as control circuitry 360 powered by a battery 370. The control circuitry is configured to communicate externally through a transmitter 380. In an example the transmitter 380 is an RF transmitter that includes an antenna 390, although other types of transmitters may be used instead or in addition, such as optical, infrared, ultrasonic, or other types.

Figure 4:
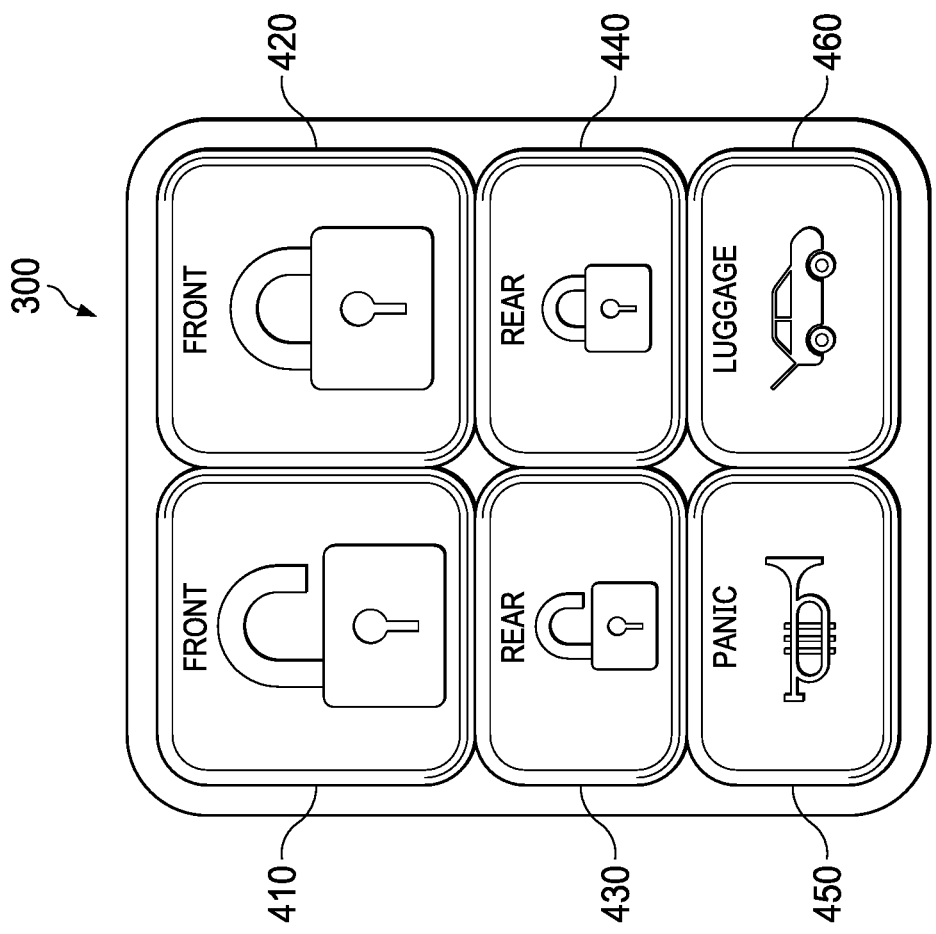
FIG. 4 is a diagrammatic illustration of an example key fob of a door and window opening system in accordance with at least one embodiment of the present disclosure.

FIG. 4 is a diagrammatic illustration of an example key fob 300 of a door and window opening system 100 in accordance with at least one embodiment of the present disclosure. In an example, the fob 300 includes a Front Open button 410, Front Close button 420, Rear Open button 430, Rear Close button 440, Panic button 450, and Luggage door button 460. Other buttons or controls, or combinations of buttons or controls, may be provided instead or in addition to those described herein.

FIG. 5 shows a flow diagram of an example remote door and window opening and closing method 500 according to at least one embodiment of the present disclosure. The method 500 includes starting logic for an example door and window opening system. In step 510, the method 500 includes receiving a signal from the fob 300.

In step 520, the method 500 includes determining whether a button (e.g., button 410, 420, 430, or 440) on the fob 300 has been pressed and released. If yes, execution proceeds to step 550. If no, execution proceeds to step 530.

In step 530, the method 500 includes determining whether a button (e.g., button 410, 420, 430, 440, 450, or 460) on the fob 300 has been pressed and held. If yes, execution proceeds to step 610 of FIG. 6. If no, execution proceeds to step 540.

In step 540, the method 500 takes no action, and simply waits until a signal from the fob 300 is received. When this occurs, execution returns to step 510.

In step 550, the method 500 includes determining which button was pressed and released. If it was a Front Open button (e.g., button 410), the method proceeds to step 560. If it was a Front Close button (e.g., button 420), the method proceeds to step 570. If it was a Rear Open button (e.g., button 430), the method proceeds to step 580. If it was a Rear Close button (e.g., button 440), the method proceeds to step 590. If it was a Panic button (e.g., button 450), the method proceeds to step 594. If it was a Luggage button (e.g., button 460), the method proceeds to step 596. In an example, if multiple buttons were pressed simultaneously, the system proceeds to step 540.

In step 560, the method 500 includes unlocking both the left (e.g., driver's side) front door and the right (e.g., passenger's side) front door.

In step 570, the method 500 includes locking both the left front door and the right front door.

In step 580, the method 500 includes unlocking both the left rear door and the right rear door.

In step 590, the method 500 includes locking both the left rear door and the right rear door.

In step 594, the method 500 includes entering panic mode. In an example, panic mode is vehicle specific and may for example include turning on an audible alarm, flashing lights, or contacting emergency services.

In step 596, the method 500 includes toggling the state of (e.g., opening or closing) a trunk or luggage door of the vehicle.

In an example, following steps 560, 570, 580, 590, 594, or 596, the system waits until another signal is received from the fob 300, and then returns to step 510.

In some embodiments, steps 570 and 590 will each result in locking of all four doors simultaneously.

Figure 6:
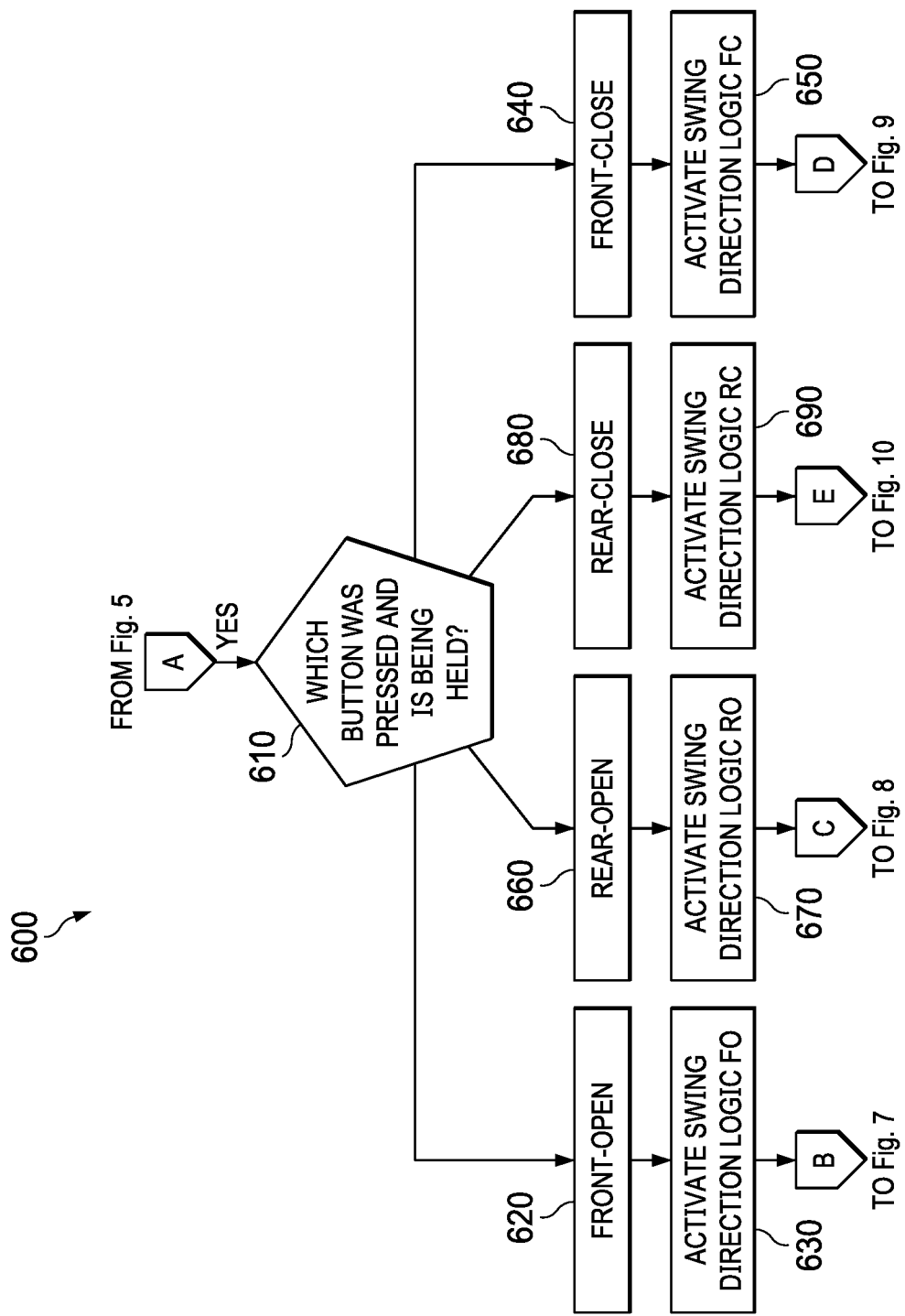
FIG. 6 shows a flow diagram of an example remote door and window opening and closing method according to at least one embodiment of the present disclosure.

FIG. 6 shows a flow diagram of an example remote door and window opening and closing method 600 according to at least one embodiment of the present disclosure. The method 600 includes button hold detection for an example door and window opening system. Step 610 may be reached for example from step 530 of method 500. In step 610, the method 600 includes determining which button is being held down. If it is a Front Open button (e.g., button 410), execution proceeds to step 620. If it is a Front Close button (e.g., button 420), execution proceeds to step 640. If it is a Rear Open button (e.g., button 430), execution proceeds to step 660. If it is a Rear Close button (e.g., button 440), execution proceeds to step 680. If a different button (e.g., not button 410, 420, 430, or 440) is held down, or if multiple buttons are held down simultaneously, execution proceeds to step 540.

In step 620, the method 600 includes determining that a Front Open button (e.g., button 410) is being held, and proceeding to step 630.

Figure 7:
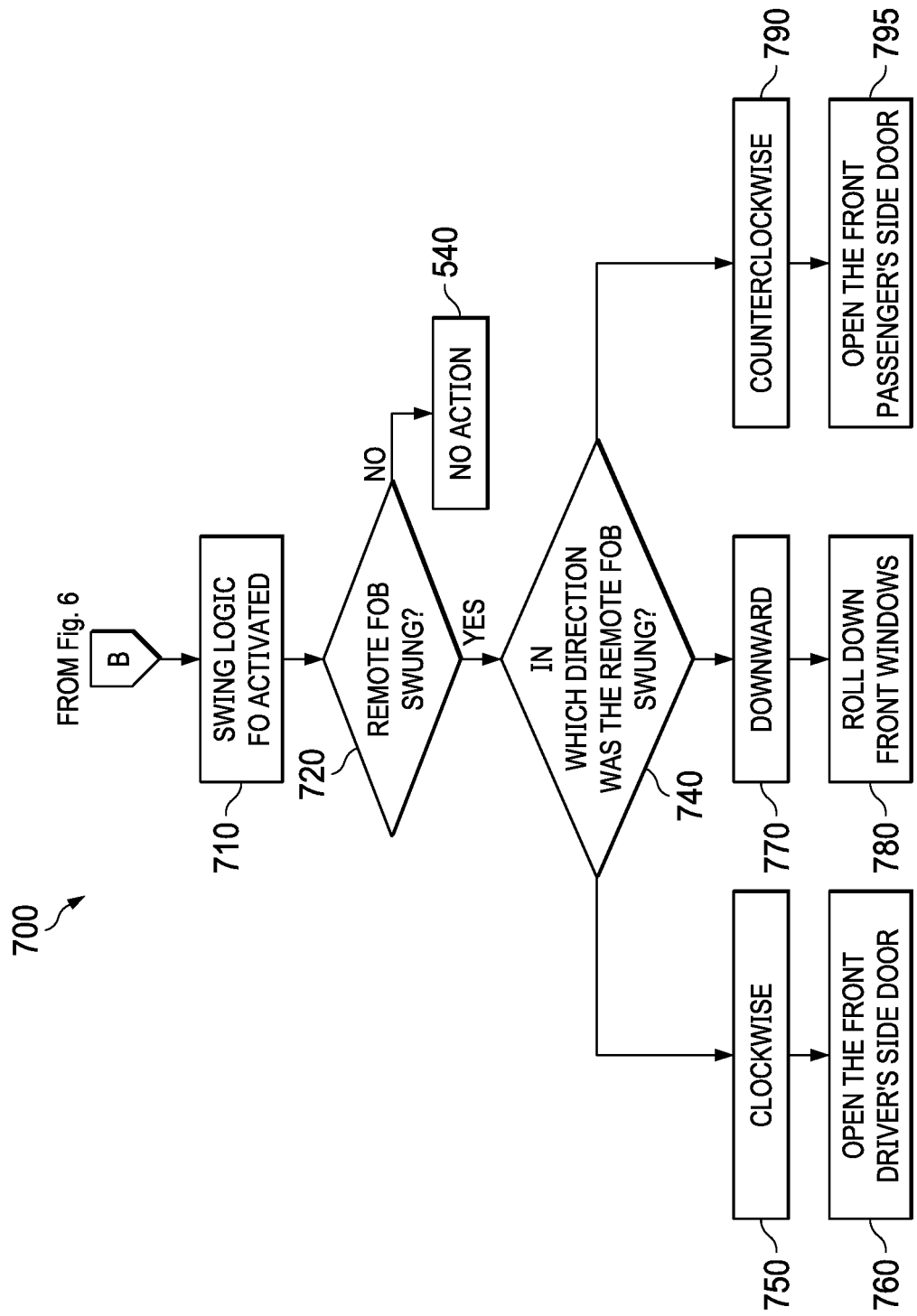
FIG. 7 shows a flow diagram of an example remote door and window opening and closing method according to at least one embodiment of the present disclosure.

In step 630, the method 600 includes activating Front Opening Swing Direction logic and proceeding to step 710 of FIG. 7.

In step 640, the method 600 includes determining that a Front Close button (e.g., button 420) is being held, and proceeding to step 650.

Figure 9:
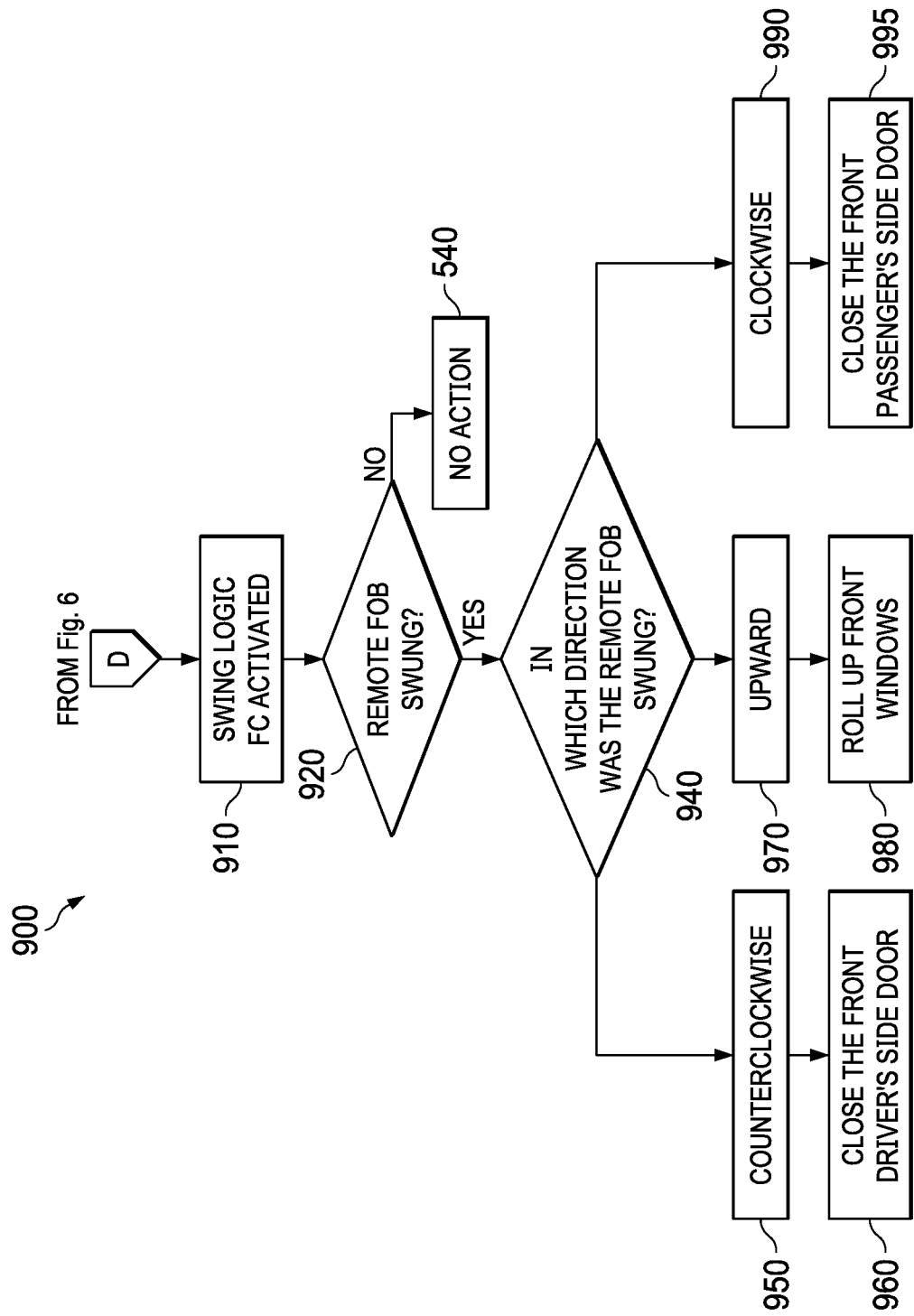
FIG. 9 shows a flow diagram of an example remote door and window opening and closing method according to at least one embodiment of the present disclosure.

In step 650, the method 600 includes activating Front Close Swing Direction logic and proceeding to step 910 of FIG. 9.

In step 660, the method 600 includes determining that a Rear Open button (e.g., button 430) is being held, and proceeding to step 670.

Figure 8:
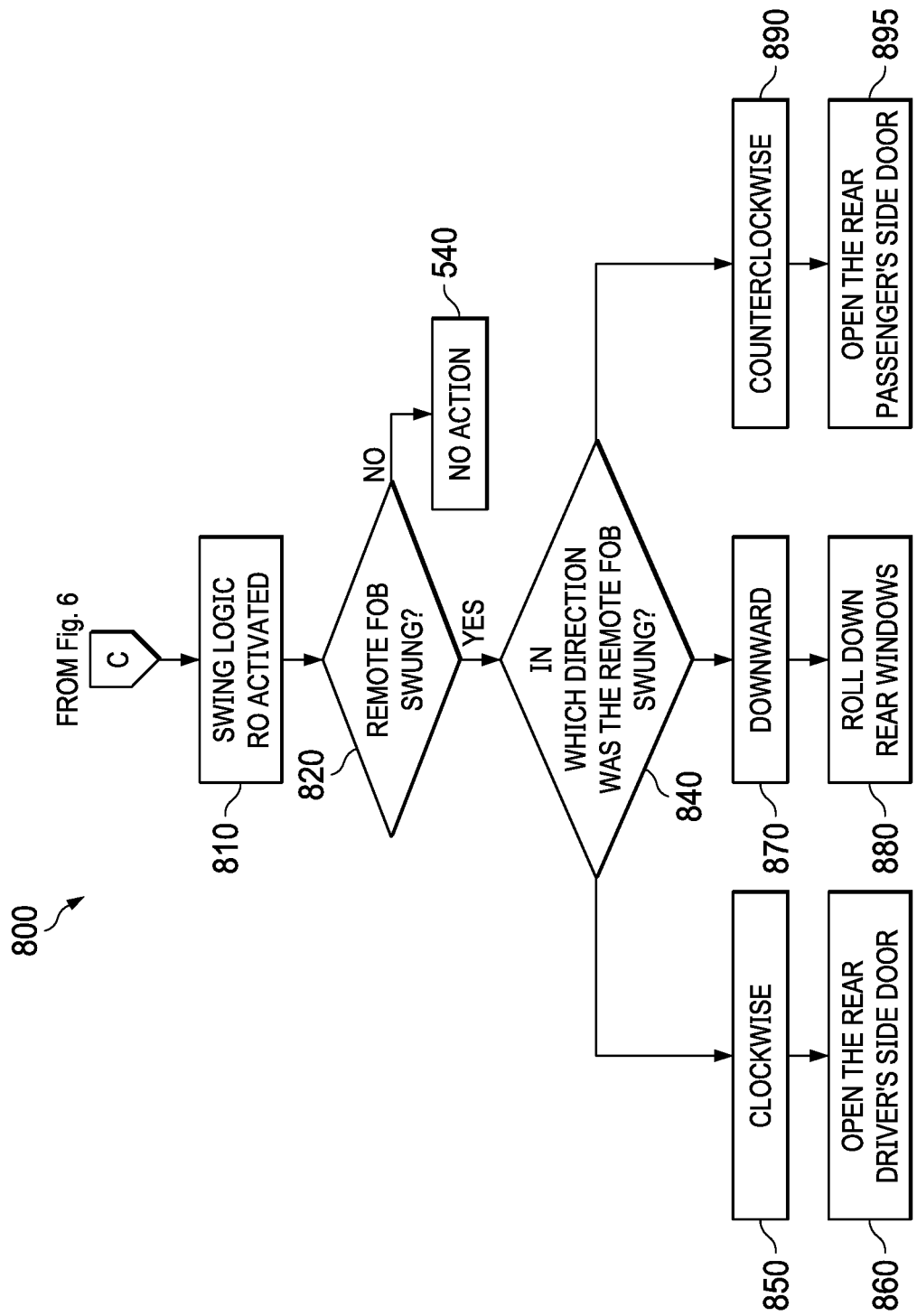
FIG. 8 shows a flow diagram of an example remote door and window opening and closing method according to at least one embodiment of the present disclosure.

In step 670, the method 600 includes activating Rear Opening Swing Direction logic and proceeding to step 810 of FIG. 8.

In step 680, the method 600 includes determining that a Rear Close button (e.g., button 440) is being held, and proceeding to step 690.

Figure 10:
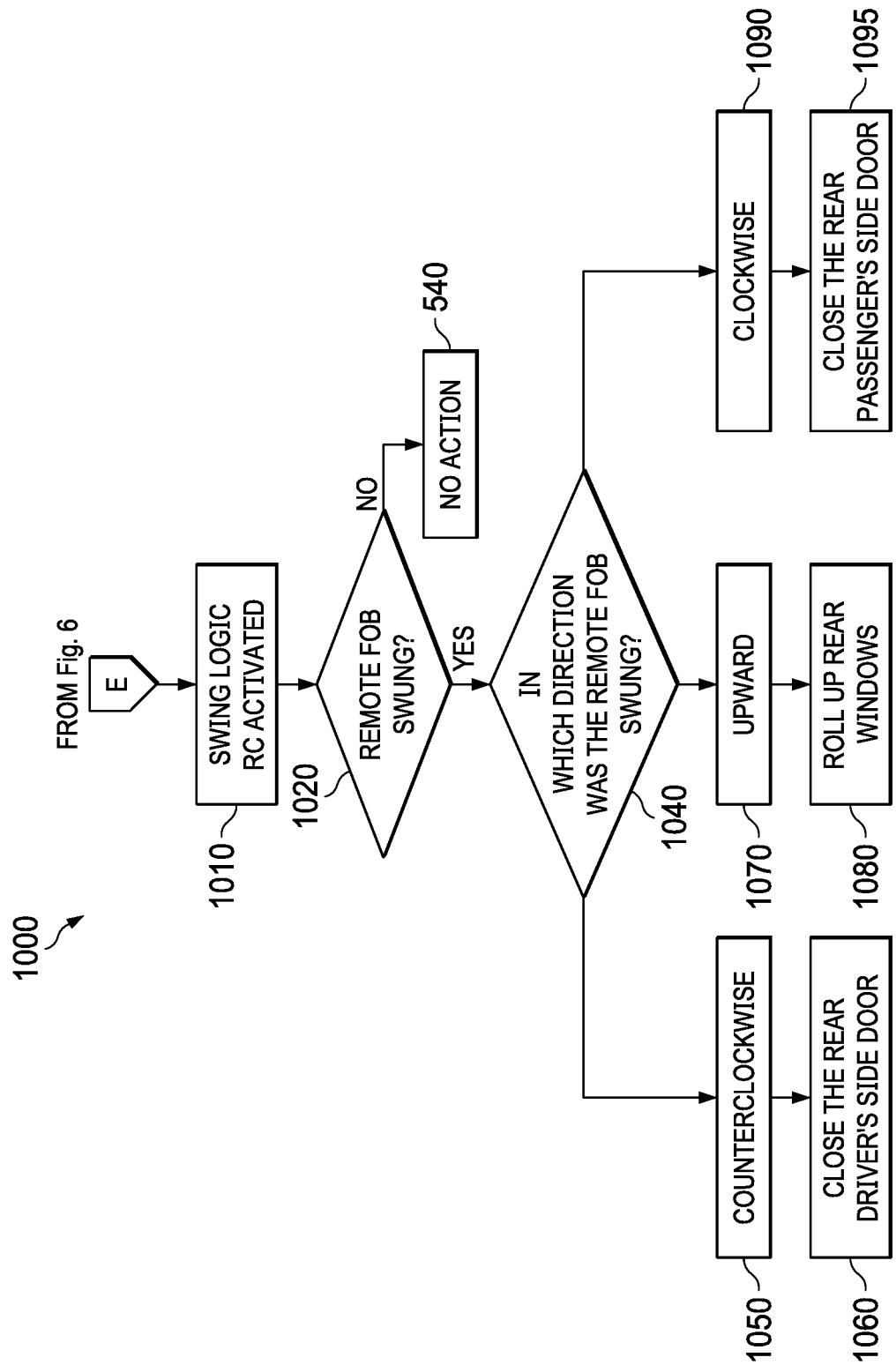
FIG. 10 shows a flow diagram of an example remote door and window opening and closing method according to at least one embodiment of the present disclosure.

In step 690, the method 600 includes activating Rear Close Swing Direction logic and proceeding to step 1010 of FIG. 10.

FIG. 7 shows a flow diagram of an example remote door and window opening and closing method 700 according to at least one embodiment of the present disclosure. The method 700 includes Front Open logic for an example door and window opening system. In step 710, the method 700 includes determining that Front Opening Swing Direction logic has been activated, and proceeding to step 720.

In step 720, the method 700 includes detecting whether the fob 300 has been swung or is presently being swung. If no, execution proceeds to step 540, described above in FIG. 5. If yes, execution proceeds to step 740.

In step 740, the method 700 includes determining in which direction the fob has been swung or is presently being swung. If the movement is determined to be clockwise, execution proceeds to step 750. If the movement is determined to be counterclockwise, execution proceeds to step 790. If the movement is determined to be downward, execution proceeds to step 770. If the movement is determined to be other than clockwise, counterclockwise, or downward, or if the movement is determined to be ambiguous, execution proceeds to step 540, described above in FIG. 5.

In step 750, the method 700 includes determining or confirming that a clockwise motion of the fob 300 has been detected, and proceeding to step 760.

In step 760, the method 700 includes opening the left front door (e.g., the driver's door).

In step 770, the method 700 includes determining or confirming that a downward motion of the fob 300 has been detected, and proceeding to step 780.

In step 780, the method 700 includes rolling down the left and right front windows.

In step 790, the method 700 includes determining or confirming that a counterclockwise motion of the fob 300 has been detected, and proceeding to step 795.

In step 795, the method 700 includes opening the right front door (e.g., front passenger's door).

In some embodiments, the door and window opening system includes a proximity sensor 235 that signals the remote opening engine 142 to restrict opening of a door if an object is determined to be within a threshold distance of the door, within a defined volume surrounding the door, or within the opening path of the door.

FIG. 8 shows a flow diagram of an example remote door and window opening and closing method 800 according to at least one embodiment of the present disclosure. The method 800 includes Rear Open logic for an example door and window opening system. In step 810, the method 800 includes determining that Rear Opening Swing Direction logic has been activated, and proceeding to step 820.

In step 820, the method 800 includes detecting whether the fob 300 has been swung or is presently being swung. If no, execution proceeds to step 540, described above in FIG. 5. If yes, execution proceeds to step 840.

In step 840, the method 800 includes determining in which direction the fob has been swung or is presently being swung. If the movement is determined to be clockwise, execution proceeds to step 850. If the movement is determined to be counterclockwise, execution proceeds to step 890. If the movement is determined to be downward, execution proceeds to step 870. If the movement is determined to be other than clockwise, counterclockwise, or downward, or if the movement is determined to be ambiguous, execution proceeds to step 540, described above in FIG. 5.

In step 850, the method 800 includes determining or confirming that a clockwise motion of the fob 300 has been detected, and proceeding to step 860.

In step 860, the method 800 includes opening the left rear door (e.g., the driver's side rear door).

In step 870, the method 800 includes determining or confirming that a downward motion of the fob 300 has been detected, and proceeding to step 880.

In step 880, the method 800 includes rolling down the left and right rear windows.

In step 890, the method 800 includes determining or confirming that a counterclockwise motion of the fob 300 has been detected, and proceeding to step 895.

In step 895, the method 800 includes opening the right rear door.

In some embodiments, the door and window opening system includes a proximity sensor 235 that signals the remote opening engine 142 to restrict opening of a door if an object is determined to be within a threshold distance of the door, within a defined volume surrounding the door, or within the opening path of the door.

FIG. 9 shows a flow diagram of an example remote door and window opening and closing method 900 according to at least one embodiment of the present disclosure. The method 900 includes Front Close logic for an example door and window opening system. In step 910, the method 900 includes determining that Front Closing Swing Direction logic has been activated, and proceeding to step 920.

In step 920, the method 900 includes detecting whether the fob 300 has been swung or is presently being swung. If no, execution proceeds to step 540, described above in FIG. 5. If yes, execution proceeds to step 940.

In step 940, the method 900 includes determining in which direction the fob has been swung or is presently being swung. If the movement is determined to be counterclockwise, execution proceeds to step 950. If the movement is determined to be clockwise, execution proceeds to step 990. If the movement is determined to be upward, execution proceeds to step 970. If the movement is determined to be other than clockwise, counterclockwise, or upward, or if the movement is determined to be ambiguous, execution proceeds to step 540, described above in FIG. 5.

In step 950, the method 700 includes determining or confirming that a counterclockwise motion of the fob 300 has been detected, and proceeding to step 960.

In step 960, the method 700 includes closing the left front door (e.g., the driver's door).

In step 970, the method 700 includes determining or confirming that an upward motion of the fob 300 has been detected, and proceeding to step 980.

In step 980, the method 700 includes rolling up the left and right front windows.

In step 990, the method 700 includes determining or confirming that a clockwise motion of the fob 300 has been detected, and proceeding to step 995.

In step 995, the method 700 includes closing the right front door (e.g., front passenger's door).

In some embodiments, the door and window opening system includes a proximity sensor 235 that signals the remote opening engine 142 to trigger an audible alert tone if a door is commanded to close but the closure is incomplete.

FIG. 10 shows a flow diagram of an example remote door and window opening and closing method 1000 according to at least one embodiment of the present disclosure. The method 1000 includes Rear Close logic for an example door and window opening system. In step 1010, the method 1000 includes determining that Rear Closing Swing Direction logic has been activated, and proceeding to step 1020.

In step 1020, the method 1000 includes detecting whether the fob 300 has been swung or is presently being swung. If no, execution proceeds to step 540, described above in FIG. 5. If yes, execution proceeds to step 1040.

In step 1040, the method 1000 includes determining in which direction the fob has been swung or is presently being swung. If the movement is determined to be counterclockwise, execution proceeds to step 1050. If the movement is determined to be clockwise, execution proceeds to step 1090. If the movement is determined to be upward, execution proceeds to step 1070. If the movement is determined to be other than clockwise, counterclockwise, or upward, or if the movement is determined to be ambiguous, execution proceeds to step 540, described above in FIG. 5.

In step 1050, the method 1000 includes determining or confirming that a counterclockwise motion of the fob 300 has been detected, and proceeding to step 1060.

In step 1060, the method 1000 includes closing the left rear door (e.g., the driver's side passenger door).

In step 1070, the method 1000 includes determining or confirming that an upward motion of the fob 300 has been detected, and proceeding to step 1080.

In step 1080, the method 1000 includes rolling up the left and right rear windows.

In step 1090, the method 1000 includes determining or confirming that a clockwise motion of the fob 300 has been detected, and proceeding to step 1095.

In step 1095, the method 1000 includes closing the right rear door.

In some embodiments, the door and window opening system includes a proximity sensor 235 that signals the remote opening engine 142 to trigger an audible alert tone if a door is commanded to close but the closure is incomplete.

In an example, following steps 760, 780, 795, 860, 880, 895, 960, 980, 995, 1060, 1080, or 1095, the method waits until another signal is received from the fob 300, and then returns to step 510. It is understood that the steps of methods 500-1000 may be performed in a different order than shown in FIGS. 5-10, additional steps can be provided before, during, and after the steps, and/or some of the steps described can be replaced or eliminated in other embodiments. One or more of steps of the methods 500-1000 can be carried by one or more devices and/or systems described herein, such as the VCU 110 or remote opening engine 142 of FIGS. 1 and 2, fob 300, and/or processor circuit 1150 of FIG. 11.

Depending on the implementation, the terms "left" and "right", and/or "up" and "down", and/or "clockwise" and "counterclockwise" may be swapped in some embodiments. In an example, clockwise or counterclockwise motion is detected as a conical, circular, or slightly elliptical (e.g., with an eccentricity of less than 0.3) movement of an axis of the fob 300 though an angle of at least 180 degrees around a cone angle of at least 30 degrees, although other values both larger or smaller could be used instead or in addition. In an example, up or down motion is detected as a movement that is linear, or that is highly elliptical (e.g., with an eccentricity of at least 0.6), along a long axis that is no more than 30 degrees off from vertical, although other values both larger or smaller could be used instead or in addition.

Figure 11:
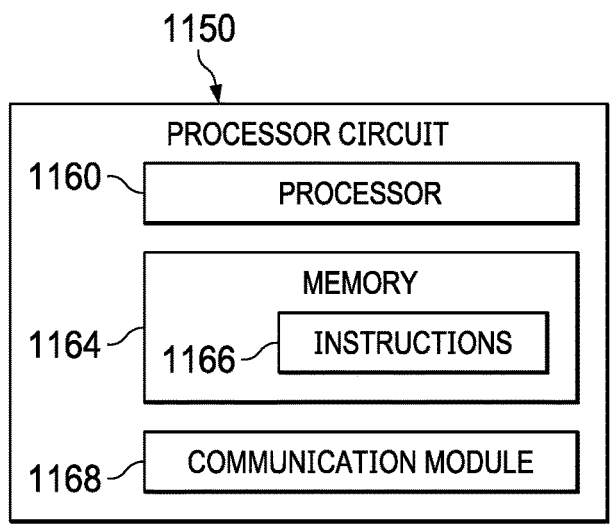
FIG. 11 is a diagrammatic illustration, in a block-diagram form, of a processor circuit, according to embodiments of the present disclosure.

FIG. 11 is a schematic diagram of a processor circuit 1150, according to embodiments of the present disclosure. The processor circuit 1150 may be implemented in the remove opening engine 142 or VCU 110 of FIGS. 1 and 2, the portable device or fob 300 of FIGS. 2, 3, and 4, or other devices or workstations (e.g., third-party workstations, network routers, etc.), or on a cloud processor or other remote processing unit, as necessary to implement the method. As shown, the processor circuit 1150 may include a processor 1160, a memory 1164, and a communication module 1168. These elements may be in direct or indirect communication with each other, for example via one or more buses.

The processor 1160 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1160 may also comprise another hardware device, a firmware device, or any combination thereof configured to perform the operations described herein. The processor 1160 may also be implemented as a combination of computing devices, e.g., a combination of a DSP and a microprocessor, a plurality of microprocessors, one or more microprocessors in conjunction with a DSP core, or any other such configuration.

The memory 1164 may include a cache memory (e.g., a cache memory of the processor 1160), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1164 includes a non-transitory computer-readable medium. The memory 1164 may store instructions 1166. The instructions 1166 may include instructions that, when executed by the processor 1160, cause the processor 1160 to perform the operations described herein. Instructions 1166 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1168 can include any electronic circuitry and/or logic circuitry to facilitate direct or indirect communication of data between the processor circuit 1150, and other processors or devices. In that regard, the communication module 1168 can be an input/output (I/O) device. In some instances, the communication module 1168 facilitates direct or indirect communication between various elements of the processor circuit 1150 and/or the vehicle door and window opening system 100. The communication module 1168 may communicate within the processor circuit 1150 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, e.g., a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 12:
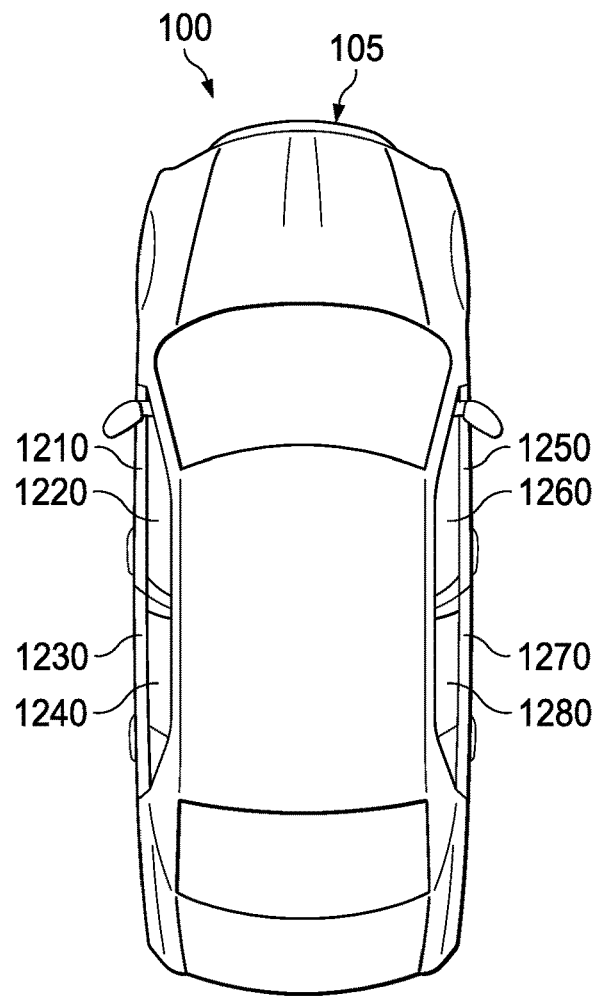
FIG. 12 is a diagrammatic illustration of at least a portion of the door and window opening system, in accordance with at least one embodiment of the present disclosure.

FIG. 12 is a diagrammatic illustration of at least a portion of the door and window opening system 100, in accordance with at least one embodiment of the present disclosure. Visible are the left front door 1210, left front window 1220, left rear door 1230, left rear window 1240, right front door 1250, right front window 1260, right rear door 1270, and right rear window 1280 of the vehicle 105.

As will be readily appreciated by those having ordinary skill in the art after becoming familiar with the teachings herein, the door and window opening system advantageously permits a vehicle operator to open, close, lock, or unlock doors and windows from a distance, such as while approaching or walking away from the vehicle. This may save time and effort, may require fewer steps, and may permit a vehicle to start cooling off before occupants enter it. This may be accomplished for example using a combination of buttons and gestures that permit a large number of different combinations to be selected using a relatively simple fob or controller. Depending on the implementation, a number of variations are possible on the examples and embodiments described above. For example, the fob 300 may be a smartphone, tablet computer, or other smart device, with buttons implemented as softkeys on a touch screen. Instead of battery power, the fob could be powered by solar energy, or by the mechanical action of swinging and button pressing, or else the fob may be an unpowered device whose movements are detected by sensors on the vehicle, or by sensors that are separate from both the fob and the vehicle. Other motions could be employed than those described herein, including linear, circular, elliptical, or polygonal motions, or combinations thereof, or complex motions that trace out letters, numbers, or symbols, or other gestures whether simple or complex. Button presses may be replaced with other input methods including but not limited to switches, sliders, touch screen elements, or voice commands. The technology may be applied to the opening and closing of other vehicle elements, including but not limited to a sunroof, hood, glove box, cargo hold, or other component that includes an open and closed position. The system may be used to activate other functions, including but not limited to heating, air conditioning, sound systems, and lights. The technology may be applied to different vehicle types, including on-road and off-road vehicles, watercraft, and aircraft.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the door and window opening system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the door and window opening system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system comprising:
    a handheld controller comprising:
        a first user control switch disposed within the handheld controller;
        a motion sensor disposed within the handheld controller and configured to detect a clockwise motion of the controller, a counterclockwise motion of the controller, and an upward or downward motion of the controller; and
        a transmitter disposed within the handheld controller and configured to transmit signals related to the motion sensor and the first user control switch;
    at least one first actuator disposed within a vehicle;
    at least one second actuator disposed on a first side of the vehicle;
    at least one third actuator disposed on a second side of the vehicle, opposite the first side;
    a receiver disposed within the vehicle and configured to receive the signals from the transmitter related to the motion sensor and the first user control switch; and
    a control unit disposed within the vehicle and in communication with the receiver and the at least one first actuator, the at least one second actuator, and the at least one third actuator;
    wherein when the signals received by the receiver indicate that the first user control switch is activated and released, the control unit commands a first action from the at least one first actuator,
    wherein when the signals received by the receiver indicate that the first user control switch is activated and held while the motion sensor detects the clockwise motion of the controller, the control unit commands a second action from the at least one second actuator, and
    wherein when the signals received by the receiver indicate that the first user control switch is activated and held while the motion sensor detects the counterclockwise motion of the controller, the control unit commands a third action from the at least one third actuator; and wherein when the signals received by the receiver indicate that the first user control switch is activated and held while the motion sensor detects the upward or downward motion of the controller, the control unit commands a fourth action from the at least one second actuator and the at least one third actuator.

2. The system of claim 1, wherein the controller is a wireless handheld controller.

3. The system of claim 1, wherein the at least one first actuator, the at least one second actuator, or the at least one third actuator controls opening, closing, locking, or unlocking of at least one component of a vehicle.

4. The system of claim 3, wherein the at least one component of the vehicle comprises a door or window.

5. The system of claim 4, further comprising a proximity sensor disposed within the vehicle and configured to detect an object within a specified volume surrounding the door, wherein the control unit is configured to restrict the opening of the door if the object is detected within the specified volume of the door.

6. The system of claim 4, wherein the control unit is configured to trigger an audible alert if the closing of the door is incomplete.

7. The system of claim 4, further comprising the vehicle.

8. The system of claim 1, wherein the motion sensor is configured to detect a plurality of defined motions of the controller, wherein the at least one first actuator, the at least one second actuator, and the at least one third actuator comprise a plurality of actuators, wherein each specific defined motion causes the controller to command a motion-specific action from the plurality of actuators when the first user control switch is activated and held while the motion sensor detects the specific defined motion.

9. The system of claim 1, further comprising a plurality of second user switches and a plurality of fourth actuators,
wherein the motion sensor is configured to detect a plurality of defined motions of the controller, and
wherein each specific second user control switch causes the controller to command:
a control-specific action from the plurality of fourth actuators when the specific second user control switch is activated and released; and
a control-specific and motion-specific action from the plurality of fourth actuators when the specific second user control switch is activated and held and the motion sensor detects a specific defined motion of the plurality of defined motions.

10. The system of claim 9, wherein the specific defined motion of the plurality of defined motions is detected by the motion sensor and identified by the control unit.

11. A method comprising:
identifying in real time, within a control unit disposed within a vehicle and in communication with a wireless handheld controller, an activation status of a first user control switch of the wireless handheld controller and a sensor output of a motion sensor configured to detect motion of the wireless handheld controller;
when the first user control switch is activated and released, commanding, via the control unit, a first action from at least one first actuator disposed within the vehicle, and
when the first user control switch is activated and held while the control unit identifies a clockwise motion of the wireless handheld controller from the sensor output of the motion sensor, commanding, via the control unit, a second action from at least one second actuator disposed on a first side of the vehicle;
when the first user control switch is activated and held while the control unit identifies a counterclockwise motion of the wireless handheld controller from the sensor output of the motion sensor, commanding, via the control unit, a third action from at least one third actuator disposed on a second side of the vehicle different from the first side; and
when the first user control switch is activated and held while the control unit identifies an upward or downward motion of the wireless handheld controller from the sensor output of the motion sensor, commanding, via the control unit, a fourth action from the at least one second actuator and the at least one third actuator.

12. The method of claim 11, wherein the at least one first actuator, the at least one second actuator, or the at least one third actuator controls the opening, closing, locking, or unlocking of at least one vehicle component.

13. The method of claim 12, wherein the at least one vehicle component comprises a door or window.

14. The method of claim 11, further comprising:
identifying in real time, within the control unit, an activation status of a plurality of second user switches; and
commanding, via the control unit, a first control-specific action from a plurality of fourth actuators when a specific second user control switch is activated and released;
commanding, via the control unit, a second control-specific action from the plurality of fourth actuators when the specific second user control switch is activated and held while the control unit identifies the clockwise motion of the wireless handheld controller;
commanding, via the control unit, a third control-specific action from the plurality of fourth actuators when the specific second user control switch is activated and held while the control unit identifies the counterclockwise motion of the wireless handheld controller; and
commanding, via the control unit, a fourth control-specific action from the plurality of fourth actuators when the specific second user control switch is activated and held while the control unit identifies the upward or downward motion of the wireless handheld controller.

15. The method of claim 11, further comprising:
commanding, via the control unit, a motion-specific action from a plurality of fourth actuators disposed within the vehicle when the first user control switch is activated and held while the control unit identifies a specific defined motion of the wireless handheld controller from a plurality of defined motions of the wireless handheld controller.

16. The method of claim 11, further comprising:
commanding, via the control unit, a control-specific and motion-specific action from a plurality of fourth actuators when a specific user control from a plurality of user controls is activated and held while the control unit identifies a specific defined motion of the wireless handheld controller from a plurality of defined motions of the wireless handheld controller.

17. A system for controlling doors and windows of a vehicle, comprising:
a wireless handheld controller comprising:
first button, a second button, a third button, and a fourth button;
a motion sensor configured to detect:

a clockwise motion of the wireless handheld controller;
a counterclockwise motion of the wireless handheld controller;
an upward motion of the wireless handheld controller; and
a downward motion of the wireless handheld controller;
a power source; and
a transmitter configured to transmit signals related to the motion sensor and the buttons; and
a vehicle comprising:
a first side;
a second side different from the first side;
a plurality of actuators;
a receiver configured to receive the signals related to the motion sensor and the buttons; and
a control unit in communication with the receiver and the plurality of actuators; such that:
when the first button is pressed and released, the control unit commands a first action from the plurality of actuators, and
when the first button is pressed and held while the motion sensor detects the clockwise motion of the wireless handheld controller, the control unit commands a second action on the first side of the vehicle from the plurality of actuators, and
when the first button is pressed and held while the motion sensor detects the counterclockwise motion of the wireless handheld controller, the control unit commands a third action on the second side of the vehicle from the plurality of actuators, and
when the first button is pressed and held while the motion sensor detects the upward motion of the wireless handheld controller, the control unit commands a fourth action on the first and second side of the vehicle from the plurality of actuators, and
when the second button is pressed and released, the control unit commands a fifth action from the plurality of actuators, and
when the second button is pressed and held while the motion sensor detects the clockwise motion of the wireless handheld controller, the control unit commands a sixth action on the first side of the vehicle from the plurality of actuators, and
when the second button is pressed and held while the motion sensor detects the counterclockwise motion of the wireless handheld controller, the control unit commands a seventh action on the second side of the vehicle from the plurality of actuators, and
when the second button is pressed and held while the motion sensor detects the upward motion of the wireless handheld controller, the control unit commands an eighth action on the first and second side of the vehicle from the plurality of actuators,
when the third button is pressed and released, the control unit commands a ninth action from the plurality of actuators, and
when the third button is pressed and held while the motion sensor detects the clockwise motion of the wireless handheld controller, the control unit commands a tenth action on the first side of the vehicle from the plurality of actuators, and
when the third button is pressed and held while the motion sensor detects the counterclockwise motion of the wireless handheld controller, the control unit commands an eleventh action on the second side of the vehicle from the plurality of actuators, and
when the third button is pressed and held while the motion sensor detects the upward motion of the wireless handheld controller, the control unit commands a twelfth action on the first and second sides of the vehicle from the plurality of actuators, and
when the fourth button is pressed and released, the control unit commands a thirteenth action from the plurality of actuators, and
when the fourth button is pressed and held while the motion sensor detects the clockwise motion of the wireless handheld controller, the control unit commands a fourteenth action on the first side of the vehicle from the plurality of actuators, and
when the fourth button is pressed and held while the motion sensor detects the counterclockwise motion of the wireless handheld controller, the control unit commands a fifteenth action on the second side of the vehicle from the plurality of actuators, and
when the fourth button is pressed and held while the motion sensor detects the upward motion of the wireless handheld controller, the control unit commands a sixteenth action on the first and second sides of the vehicle from the plurality of actuators.

18. The system of claim 17, further comprising a panic button and a luggage door button, wherein the controller is configured to enter a panic mode when the panic button is depressed, and wherein the controller is configured to activate a luggage door actuator when the luggage door button is depressed, and wherein the first button is a front open button, the second button is a front close button, the third button is a rear open button, and the fourth button is a rear close button.

* * * * *